(12) United States Patent
Watanabe et al.

(10) Patent No.: US 12,473,462 B2
(45) Date of Patent: Nov. 18, 2025

(54) METHOD FOR JUDGING AUTHENTICITY AND PRESSURE-SENSITIVE ADHESIVE SHEET

(71) Applicant: NITTO DENKO CORPORATION, Ibaraki (JP)

(72) Inventors: Shigeki Watanabe, Ibaraki (JP); Masahito Niwa, Ibaraki (JP); Yuki Tsubaki, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 998 days.

(21) Appl. No.: 17/432,536

(22) PCT Filed: Feb. 22, 2019

(86) PCT No.: PCT/JP2019/006888
§ 371 (c)(1),
(2) Date: Aug. 20, 2021

(87) PCT Pub. No.: WO2020/170448
PCT Pub. Date: Aug. 27, 2020

(65) Prior Publication Data
US 2022/0146454 A1  May 12, 2022

(51) Int. Cl.
*C09J 7/25* (2018.01)
*C09J 7/38* (2018.01)
*C09J 7/40* (2018.01)

(52) U.S. Cl.
CPC ............ *C09J 7/255* (2018.01); *C09J 7/38* (2018.01); *C09J 7/401* (2018.01); *C09J 2467/00* (2013.01);
(Continued)

(58) Field of Classification Search
CPC ..... C09J 7/255; C09J 7/401; C09J 7/38; C09J 2467/00; C09J 2467/005; C09J 2467/006; G01N 2458/15
See application file for complete search history.

(56) References Cited

U.S. PATENT DOCUMENTS 8,871,319 B2 * 10/2014 Stanley ............... B65D 65/466
428/34.7
9,475,967 B2 * 10/2016 Lipscomb ............... C09J 7/385
(Continued)

FOREIGN PATENT DOCUMENTS

CN   102051137 A   5/2011
CN   106414049 A   2/2017
(Continued)

OTHER PUBLICATIONS

Machine translation of JP-2017008191-A (Year: 2017).*
(Continued)

Primary Examiner — Octavia Hollington
(74) Attorney, Agent, or Firm — Sughrue Mion, PLLC

(57) ABSTRACT

An objective is to provide a method for judging the authenticity of a product or component. Provided is a method for judging product or component authenticity. The method includes a step of determining the percentage of radioactive carbon-14 based on ASTM 6866 with respect to at least one constituent that a product or component of interest obtained has. Here, at least one constituent that an authentic product or component has and that corresponds to the constituent of the product or component of interest includes a resin comprising a prescribed percentage of radioactive carbon-14.

9 Claims, 3 Drawing Sheets

(52) U.S. Cl.
CPC .... *C09J 2467/005* (2013.01); *C09J 2467/006* (2013.01); *G01N 2458/15* (2013.01)

(56) References Cited

U.S. PATENT DOCUMENTS

| | | | |
|---|---|---|---|
| 2011/0171410 A1 | 7/2011 | Nakagawa et al. | |
| 2012/0258305 A1 | 10/2012 | Haruta et al. | |
| 2012/0288692 A1* | 11/2012 | Broyles | B65D 65/40 428/220 |
| 2014/0058059 A1 | 2/2014 | Okubo et al. | |
| 2016/0003722 A1 | 1/2016 | Kombolias | |
| 2017/0158918 A1 | 6/2017 | Jozuka et al. | |
| 2019/0243041 A1 | 8/2019 | Takarada et al. | |
| 2020/0208022 A1* | 7/2020 | Niwa | C09J 7/385 |
| 2022/0146454 A1* | 5/2022 | Watanabe | C09J 7/255 |
| 2022/0169895 A1* | 6/2022 | Watanabe | C09J 7/255 |
| 2023/0383145 A1* | 11/2023 | Yamamoto | C09J 7/38 |

FOREIGN PATENT DOCUMENTS

| | | |
|---|---|---|
| CN | 107286857 A | 10/2017 |
| JP | 2009-128283 A | 6/2009 |
| JP | 2009-244106 A | 10/2009 |
| JP | 5316725 B1 | 10/2013 |
| JP | 2014085292 A * | 5/2014 |
| JP | 2015-189160 A | 11/2015 |
| JP | 2016-029155 A | 3/2016 |
| JP | 2016-099646 A | 5/2016 |
| JP | 2017008191 A * | 1/2017 |
| JP | 6217600 B2 | 10/2017 |
| KR | 10-2012-0127604 A | 11/2012 |
| KR | 10-2017-0096569 A | 8/2017 |
| KR | 10-2018-0054574 A | 5/2018 |
| KR | 10-2018-0077085 A | 7/2018 |
| KR | 10-2019-0096268 A | 8/2019 |
| WO | 2015/056499 A1 | 4/2015 |
| WO | 2016/186122 A1 | 11/2016 |

OTHER PUBLICATIONS

Extended European Search Report dated Sep. 6, 2022 from the European Patent Office in EP Application No. 19916216.5.

ASTM International Designation D6866-18, "Standard Test Methods for Determining the Biobased Content of Solid, Liquid, and Gaseous Samples Using Radiocarbon Analysis", 2018 Annual Book of ASTM Standard, 2018, p. 670-688, Section 8, vol. 08.03, ASTM International.

International Search Report of PCT/JP2019/006888 dated May 14, 2019 [PCT/ISA/210].

First Office Action issued Dec. 29, 2023 by the State Intellectual Property Office of People's Republic of China in Chinese Application No. 201980092689.6.

Korean Office Action dated Sep. 25, 2023 in Korean Application No. 10-2021-7030211.

Decision of Rejection issued Jan. 8, 2025 in Chinese Application No. 201980092689.6.

Second Office Action dated Sep. 25, 2024 issued by the State Intellectual Property Office of People's Republic of China in CN Application No. 201980092689.6.

Communication issued Jun. 4, 2025 in European Application No. 19916216.5.

Tesa, "Our Responsibility—Our Commitment", Tesa Sustainability Report, 2016, pp. 1-26.

* cited by examiner

METHOD FOR JUDGING AUTHENTICITY AND PRESSURE-SENSITIVE ADHESIVE SHEET

CROSS REFERENCE TO RELATED APPLICATIONS

This application is a National Stage of International Application No. PCT/JP2019/006888 filed on Feb. 22, 2019.

TECHNICAL FIELD

The present invention relates to an authenticity judging method and a pressure-sensitive adhesive sheet.

BACKGROUND ART

Cheap counterfeit products and allegedly IP-infringing goods (or hereinafter comprehensively referred to as "counterfeits") are distributed in domestic and foreign markets. Such counterfeits are generally inferior in performance to authentic products and inconsistent in quality; and therefore, they are likely to malfunction. If neglected, they may impede equitable distributions of authentic products and also damage reputations of the products and manufacturers. Thus, suppliers of products and components have made painstaking efforts to develop countermeasures.

CITATION LIST

Patent Literature

[Patent Document 1] Japanese Patent Application Publication No. 2009-128283
[Patent Document 2] Japanese Patent No. 5316725
[Patent Document 3] International Patent Application WO 2016/186122

SUMMARY OF INVENTION

Technical Problem

In the anti-counterfeit measures, it is essential to identify counterfeits. With respect to chemical products and materials, counterfeits are often identified by elemental analysis such as IR (infrared spectroscopy) and NMR (nuclear magnetic resonance). For instance, unlike a product for which the appearance, labelling and product information can be used, the sort of bonding members such as PSA sheets are often available only internal to products and there are cases where their states or properties before put in use cannot be inspected or evaluated. In such cases, it is not easy to distinguish between patent infringement cases and genuine own products, making it necessary to rely on elemental analysis. However, identification of counterfeits by elemental analysis requires expertise and analytical skills. Another issue is that when precision of analysis is pursued to ensure reliability of counterfeit identification, the cost and time required will hamper implementation of quick countermeasures. Furthermore, the degree of counterfeiting varies among counterfeits and it is sometimes difficult to make judgments on precise replicas with sufficient confidence because of the limited analytical precision, etc. Depending on the materials used and so on, there are even cases where no suitable analytical means are available for identifying counterfeits.

Studies by the present inventors on the measures against such events have resulted in a finding that by allowing a resin included in a product or component to comprise a prescribed percentage of carbon-14 ($^{14}C$), authenticity judgments can be made quickly with great reliability; whereby the present invention has been completed. In other words, an objective of the present invention is to provide a method for judging the authenticity of a product or component. Another objective of this invention is to provide a PSA sheet that can be favorably used in the method.

Solution to Problem

The present Description provides a method for judging the authenticity of a product or component. The method includes a step of determining the percentage of radioactive carbon-14 based on ASTM D6866 with respect to at least one constituent of a product or component obtained to be judged. Here, at least one constituent included in an authentic product or component that corresponds to the constituent of the product or component subject to the authenticity judgment includes a resin comprising a prescribed percentage (or percent $^{14}C$) of radioactive carbon-14.

According to the method, the percent $^{14}C$ of a constituent of a product or component to be judged (a product or component of interest, or hereinafter comprehensively referred to as an "object of interest") can be compared to the percent $^{14}C$ of the corresponding constituent of the authentic product or component (or hereinafter referred to as an "authentic item") to determine whether or not the object of interest is an authentic item. According to this method, a quick and highly reliable judgment is possible. It is noted that Patent Document 1 describes a method for identifying biomass-derived glycol, but does not discuss its use for identifying counterfeits.

In particular, the authenticity judging method disclosed herein may include a step of judging the product or component of interest authentic when the constituent of the product or component of interest has a biomass carbon ratio in the range of ±5% of the biomass carbon ratio of the constituent of the authentic product or component, and judging the product or component of interest inauthentic when out of the ±5% range. This method enables a precise authenticity judgment within an error margin of ±5% as described above.

The method disclosed herein preferably includes a step of obtaining the product or component of interest from a market where the authentic product or a product comprising the authentic component is distributed. The method disclosed herein can make a quick authenticity judgement with great precision using an object of interest obtained from a market; and therefore, it is possible to efficiently identify counterfeits and trace authentic items.

The constituent of the authentic product or component preferably has a biomass carbon ratio of 5% or higher. When the biomass carbon ratio is at a specific percentage selected from the ±5% range, a highly reliable authenticity judgment can be made based on the measurement result of the biomass carbon ratio.

In some embodiments, the product or component is a PSA sheet. The PSA sheet can be one of the following: (A) a PSA sheet comprising a substrate layer and a PSA layer placed on at least one face of the substrate layer; (B) a release-lined PSA sheet comprising a PSA sheet that includes a substrate layer and a PSA layer placed on at least one face of the substrate layer, and further comprising a release liner protecting an adhesive face of the PSA layer; and (C) a release-lined PSA sheet comprising a PSA sheet formed of a PSA layer as well as an adhesive face of a release liner protecting the PSA layer. In the PSA sheet, among the substrate layer, the PSA layer and the release liner substrate layer, at least one is a constituent that includes a resin comprising a prescribed percentage of radioactive carbon-14. In an embodiment where the object of interest is a PSA sheet, for instance, when a resin component of one constituent among constituents of the PSA sheet (substrate layer, PSA layer and release liner substrate layer) is allowed to comprise a prescribed percentage of $^{14}C$, by subjecting only the one constituent to $^{14}C$ analysis (determination of percent $^{14}C$), the authenticity of the PSA sheet can be efficiently judged. In addition, for instance, when the substrate layer is formed with a biomass material to have a certain percentage of $^{14}C$ and the PSA layer is formed only from materials based on fossil resources (fossil-based materials) or formed with a biomass material to comprise a prescribed percentage of $^{14}C$, by carrying out $^{14}C$ analysis individually on the substrate layer and the PSA layer (i.e. by making judgments on multiple constituents), the reliability of authenticity judgments can be further increased.

In some embodiments, the PSA sheet has the PSA layer, the substrate layer and the release liner substrate layer as the constituents. The PSA layer, the substrate layer and the release liner substrate layer comprise resins having the same or different percentages of radioactive carbon-14. By using resins that comprise prescribed percentages (the same or individually different percentages) of $^{14}C$ in all of the PSA layer, substrate layer and release liner constituting the PSA sheet, the reliability of authenticity judgments can be further increased.

In some preferable embodiments, the PSA sheet includes a polyester resin film layer as the substrate layer and/or the release liner substrate layer. The polyester resin film layer is a constituent comprising a prescribed percentage of radioactive carbon-14. Unlike a PSA potentially including plant-based ingredients such as natural rubber and rosin, implementation of a PSA sheet having a biomass carbon-containing polyester resin film has not been reported (e.g. Patent Documents 2, 3). Thus, with respect to a polyester resin film in a PSA sheet, it is highly possible to make an authenticity judgment solely based on the presence or absence of biomass carbon, making it suitable for counterfeit identification by $^{14}C$ analysis. For the highly heat-resistant and rigid nature, even when included in a product/component or even after used, the polyester resin film is easily collected in an analyzable form in a required amount; and in this view, it also makes a suitable object for an authenticity judgment. Furthermore, unlike the PSA that dictates the adhesive properties, the polyester resin film in the PSA sheet is used as a support substrate or release liner; and therefore, even if replaced with a biomass material, it has no or minimal (if any) impact on changing the properties as a PSA sheet. In the field of PSA sheets, by using a polyester resin film comprising a certain percentage of $^{14}C$, quick and highly reliable authenticity judgments can be preferably made.

In the method disclosed herein, the PSA sheet is an adhesively double-faced PSA sheet and is a fixing member of a part constituting an electronic device. With a specific constituent collected from the PSA sheet integral to the electronic device, based on its $^{14}C$ analysis, a quick and highly reliable authenticity judgment can be made. In many cases, PSA sheets for fixing parts of electronic devices are available only internal to products, as thin as about some 10 micrometers, or tightly bonded to adherends; and therefore, it is highly difficult to distinguish counterfeits apart. With respect to a PSA sheet used in such an application, there is a great advantage to applying the highly-precise authenticity judging method disclosed herein. In this embodiment, as the constituent, a polyester resin film layer is preferably used.

The present Description provides a PSA sheet used by a method disclosed herein. The PSA sheet has one of the following constitutions: (A) a PSA sheet comprising a substrate layer and a PSA layer placed on at least one face of the substrate layer; (B) a release-lined PSA sheet comprising a PSA sheet that includes a substrate layer and a PSA layer placed on at least one face of the substrate layer, and further comprising a release liner protecting an adhesive face of the PSA layer; and (C) a release-lined PSA sheet comprising a PSA sheet formed of a PSA layer as well as a release liner protecting an adhesive face of the PSA layer. Among the substrate layer, the PSA layer and the release liner substrate layer, at least one includes a resin comprising a prescribed percentage of radioactive carbon-14. The PSA sheet having such a constitution is particularly suitable for the authenticity judgment disclosed herein and can be preferably used in the method.

This Description also provides a PSA sheet having one of the following constitutions: (A) a release-lined PSA sheet comprising a PSA sheet that includes a substrate layer and a PSA layer is placed on at least one face of the substrate layer, and further comprising a release liner protecting an adhesive face of the PSA layer; and (B) a release-lined PSA sheet comprising a PSA sheet formed of a PSA layer as well as a release liner protecting an adhesive face of the PSA layer. In this PSA sheet, each of the substrate layer, the PSA layer and the release liner substrate layer includes a resin comprising radioactive carbon-14. The PSA sheet having such a constitution can be preferably used for the authenticity judgment disclosed herein. The use of the PSA sheet can further increase the reliability of authenticity judgments.

This Description provides a PSA sheet having one of the following constitutions: (A) a PSA sheet comprising a substrate layer and a PSA layer placed on at least one face of the substrate layer; (B) a release-lined PSA sheet comprising a PSA sheet that includes a substrate layer and a PSA layer placed on at least one face of the substrate layer and further comprising a release liner protecting an adhesive face of the PSA layer; and (C) a release-lined PSA sheet comprising a PSA sheet formed of a PSA layer as well as a release liner protecting an adhesive face of the PSA layer. The PSA sheet comprises a polyester resin film layer as the substrate layer and/or the release liner substrate layer. The polyester resin film has a biomass carbon ratio of 5% or higher. The PSA sheet in this embodiment can be preferably used for the authenticity judgment disclosed herein.

DESCRIPTION OF EMBODIMENTS

Figure 1:
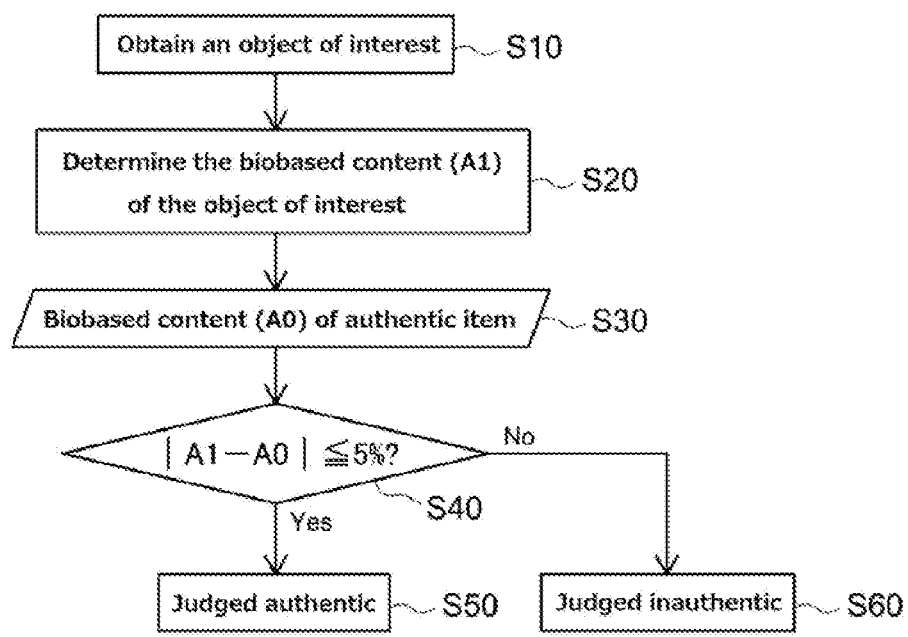
FIG. 1 shows a flow chart illustrating the authenticity judging method according to an embodiment.

Preferred embodiments of the present invention are described below. Matters necessary to practice this invention other than those specifically referred to in this description may be comprehended by a person of ordinary skill in the art based on the instruction regarding implementations of the invention according to this description and the common technical knowledge in the pertinent field. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate sizes or reduction scales of actual products provided.

<Authenticity Judging Method>

The authenticity judging method disclosed herein is a method for judging the authenticity of a product or component. FIG. 1 shows a flow chart of the authenticity judging method according to an embodiment. In reference to FIG. 1, the authenticity judging method disclosed herein is described in detail.

(Object of Interest)

The object (product, component) subject to the authenticity judgment disclosed herein are obtained by a suitable method (S10). The obtaining method is not particularly limited. For, instance, it can be obtained by purchasing a commercial product from a market where authentic and inauthentic items are distributed. When the object of interest is a component, a product including the component can be acquired and disassembled to obtain the target component. The objects of interest disclosed herein may include an authentic item and an inauthentic item (possibly a counterfeit). It is typically difficult to judge the authenticity in their available forms, solely based on their appearance, labelling and product information. To such a product or component (or hereinafter referred to as an "article"), the authenticity judging method disclosed herein can be preferably applied.

The article as the object of interest is not particularly limited. Objects of interest can be products and their components (various parts; coatings; films for optical, decorative, protective purposes, etc.; the sort of bonding members such as PSA sheets and adhesives) used in various fields such as various electrical products including household electrical appliances, electronic devices, electronic parts, precision equipment, automotive interior and exterior components, furniture, clothing, decorative items, sporting goods, medical parts, cooking tools, tableware, various containers, miscellaneous goods, musical instruments and building materials. The article is formed of at least one (e.g. two, three or more) constituent. In many preferable embodiments, the article includes at least one constituent (resin member) formed from a resin such as a synthetic resin.

The type of resin (e.g. synthetic resin) forming the resin member is not particularly limited. Examples include polyester resins such as polyethylene terephthalate (PET), polyethylene naphthalate (PEN), polybutylene terephthalate (PBT), polybutylene naphthalate (PBN), polyethylene furanoate (PEF) and polybutylene succinate (PBS); polyolefin resins such as polyethylene (PE), polypropylene (PP), ethylene-propylene copolymer and ethylene-butene copolymer; polycarbonate (PC); urethane resin; polyether; acrylic resin; rubbers such as natural rubber, modified natural rubber and synthetic rubber (chloroprene rubber, styrene-butadiene rubber, nitrile rubber, etc.); vinyl chloride resin; vinylidene chloride resin; vinyl acetate resin; polyvinyl alcohol; polystyrene; polyacetal; polyimide; polyamide; fluororesin; silicone resin; phenolic resin; melamine resin; urea resin; epoxy resin; polylactic acid; and cellophane. These can be used singly as one species or in a combination of two or more species.

A typical example of the article as the object of interest is a PSA sheet. The form of PSA sheet is not particularly limited. A PSA sheet in which a PSA layer is placed on at least one face of a substrate layer can be used. The PSA sheet can be a release-lined PSA sheet having a PSA sheet in which a PSA layer is placed on at least one face of a substrate layer and further having a release liner protecting an adhesive face of the PSA layer; or it can also be a release-lined PSA sheet having a PSA sheet formed of a PSA layer as well as a release liner protecting an adhesive face of the PSA layer. Other examples of the article as the object of interest include a release liner. The release liner can typically be a release liner used for protecting adhesive faces of PSA sheets.

In some embodiments, the article is a polyester resin-containing article. Non-limiting examples include polyester resin film-containing products and components such as wrapping films, various optical films, protective films and PSA sheets; polyester resin molded items such as containers (typically bottles); polyester resin fabric-containing items such as woven fabrics, knitted items and non-woven fabrics of clothing. Polyester resin is highly heat-resistant and rigid, and easily collected in an analyzable form in a required amount even when included in a product/component or after used. Favorable examples of the object of interest disclosed herein include a PSA sheet comprising a polyester resin film. For instance, in case of a PSA sheet fixing parts in an electronic device, upon disassembly of the electronic device, the polyester resin member of the PSA sheet as the object of interest can be collected from the bonding interface between the parts and subjected to the $^{14}$C analysis described below.

(Authentic Item)

The authentic product or component in an authenticity judgment has at least one constituent that includes a resin (e.g. synthetic resin) and the resin comprises a prescribed percentage of $^{14}$C. Except for this, there are no particular limitations. The authentic item has the same or a similar constitution as the object of interest. When the authentic item includes two or more (e.g. three or more) constituents, it is preferable that each of the two or more (e.g. three or more) constituents includes a resin comprising a prescribed percentage of $^{14}$C. The constituent is preferably formed from a resin. For instance, with respect to a resin member formed from a synthetic resin or the like, it is easy to set the percent $^{14}$C in a specific stable range by a species of biomass material and its ratio of use; and therefore, the constituent of the authentic product or component is preferably a resin member. In many cases, $^{14}$C is typically uniformly distributed with its percentage staying more or less constant throughout. For such a resin member, regardless of the site of sampling, consistent percentages of $^{14}$C can be measured. Examples of types of authentic products or components and the material (resin material in particular) of a constituent thereof include the types and materials described for the object of interest. In particular, acrylic resin, rubbers, polyester resin, polyolefin resin and urethane resin are preferable as prescribed percentages of $^{14}C$ are readily obtained using biomass materials. In the PSA sheet as an example of the article, at least one constituent (one among the substrate layer, PSA layer and release liner substrate layer) of an authentic PSA sheet includes a resin comprising a prescribed percentage of $^{14}C$. From the standpoint of increasing the reliability of judgments, it is preferable that the PSA layer, substrate layer and release liner of the authentic PSA sheet all individually comprise resins having the same or different percentages of $^{14}C$.

The percent $^{14}C$ of the constituent of the authentic item can just be at a specific value selected from the range obtained by the measurement method described below. For instance, the constituent of the authentic item has a biomass carbon ratio of suitably about 1% or higher, or preferably 5% or higher. When the biomass carbon ratio is at a specific value selected from such a range, the percentage of $^{14}C$ can be determined with great precision. The biomass carbon ratio of the constituent is more preferably at a specific value selected from the range of about 8% or higher (e.g. about 12% or higher, typically about 15% or higher) and 100% or lower (typically 50% or lower, e.g. 30% or lower). By using a prescribed amount of a biomass material, the biomass carbon ratio can be adjusted to a specific value.

In some embodiments, the authentic item (e.g. a PSA sheet) has a constituent formed from a polyester resin (i.e. a polyester resin member, e.g. a polyester resin film) and the polyester resin member comprises a prescribed percentage of $^{14}C$. A biomass-derived polyester resin (biomass polyester resin) can be used to incorporate a specific amount of $^{14}C$ in the polyester resin member. In typical, the polyester resin member (typically a polyester resin film) has a uniform distribution of $^{14}C$ with more or less constant percentages throughout; and regardless of the site of sampling in the polyester resin member, consistent percentages of $^{14}C$ can be measured. It is noted that, for instance, when the authenticity of a PSA sheet having a polyester resin film layer is judged according to the art disclosed herein, there is an advantage to the polyester resin film as authenticity judgments can be often made solely based on the presence or absence of biomass carbon.

The biomass carbon ratio of the polyester resin member is, for instance, suitably about 1% or higher, or preferably about 5% or higher. When the polyester resin's biomass carbon ratio is at a specific percentage selected from such a range, the percent $^{14}C$ can be determined with great precision. The polyester resin's biomass carbon ratio is more preferably at a specific value selected from the range of about 8% or higher (e.g. about 12% or higher, typically about 15% or higher) and 100% or lower (typically 50% or lower, e.g. 30% or lower).

As used herein, the biomass carbon refers to carbon (renewable carbon) contained in a biomass material, that is, a material derived from a renewable organic resource. The biomass material refers to a material derived from a bioresource (typically a photosynthetic plant) that is continuously renewable typically in the sole presence of sun light, water and carbon dioxide. Accordingly, the concept of biomass material excludes materials based on fossil resources (fossil-based materials) that are exhausted by using after mining.

The "biomass carbon ratio" (or the "biobased content") here refers to the ratio of biomass carbons to all carbons in a measurement sample (specimen) and is determined based on ASTM D6866. Among the methods described in ASTM D6866, Method B with high precision is preferable. The same applies to the biobased content of the PSA layer, substrate layer, release liner and PSA sheet as well as the biobased content of biomass polyester resin film described later. The biomass carbon ratio here is determined from the percent $^{14}C$ (unit: pMC (percent modern carbon)) relative to the standard value (modern reference standard) defined by a standard substance. In particular, the biomass carbon ratio (%) here can be determined by dividing the measured percent $^{14}C$ (pMC) by 1.005.

(Measurement of Percent $^{14}C$)

Subsequently, with respect to a constituent of the article of interest obtained as described above, the percent $^{14}C$ is measured (S20). This measurement can be determination of biobased content. The percent $^{14}C$ and biobased content are determined based on ASTM D6866. For easy comparison, the biobased content is preferably used as the measurement value. To avoid contamination from other sites, the sample (a constituent of the article of interest, e.g. a polyester resin member) used for the measurement is subjected as necessary to a process such as washing. For instance, with respect to a PSA sheet having a polyester resin film as a substrate layer, the polyester resin film is measured after the PSA is removed with water, a solvent, etc. A release-lined PSA sheet having a polyester resin film layer can be measured while having a release treatment layer such as a silicone resin layer, or after the release liner is separated from the PSA and the release treatment layer (a silicone resin layer, etc.) is removed off the polyester resin film layer with a solvent, etc.

(Judgment)

The resulting percent $^{14}C$ (A1) of the constituent of the object of interest can be compared with the percent $^{14}C$ (A0) of the corresponding constituent of the authentic item to judge whether or not the object of interest is an authentic item (S40). For the measurement value A0, it is possible to use a pre-measured value or a value determined simultaneously with the percent $^{14}C$ measurement for the constituent of the object of interest (S30).

In some preferable embodiments, an authenticity judgment is made based on the biobased content. The object of interest is judged "authentic" when the constituent (e.g. a polyester resin member) thereof has a biobased content in the range of ±5% of the biobased content of the corresponding constituent (e.g. a polyester resin member) of the authentic item (S50). The object of interest is judged "inauthentic" when out of the ±5% range (S60). When using Method B of ASTM D6866, as the judgment standard, in place of the ±5% range of the biobased content it is possible to use the range of ±3% or ±1% (even ±0.5%, e.g. ±0.2%).

While the embodiments described above are focused on authenticity judging methods for a PSA sheet having a polyester resin film, the art disclosed herein is not limited to these. With respect to the articles exemplified above and constituents formed from the various materials exemplified above, $^{14}C$ analysis can be conducted to judge the authenticity. For instance, when the object of interest is a PSA sheet, the PSA layer (possibly acrylic or rubber-based) of the PSA sheet can be subjected to $^{14}C$ analysis and compared to the percent $^{14}C$ of an authentic item to make an authenticity judgment or trace authentic items.

In some embodiments, by conducting $^{14}C$ analysis on only one constituent of the article, the authenticity of the article can be efficiently judged. In other embodiments, by conducting $^{14}C$ analysis and making judgments on two or more (e.g. three or more) constituents of the article, the reliability of authenticity judgments can be increased. In this embodiment, for instance, among possible constituents of an authentic item, only one constituent is formed with a biomass resin material to comprise a prescribed percentage of $^{14}C$ while another constituent is formed solely from fossil-based materials; and $^{14}C$ analysis can be conducted on these two constituents. Alternatively, two or more (e.g. three or more) constituents of the authentic item are formed with biomass resin materials to comprise prescribed percentages of $^{14}C$ (all same $^{14}C$ percentage or different $^{14}C$ percentages) and $^{14}C$ analysis is conducted on these constituents to make a highly reliable judgment.

When $^{14}C$ analysis is conducted on two or more constituents of the object of interest for comparison with the authentic item, in view of increasing the reliability of judgments, it is preferable that each of these constituents is a polyester resin member. Favorable examples of the object of interest include a PSA sheet having a substrate layer and a release liner substrate layer, each of which being a polyester resin film layer. Other examples include a PSA sheet of which both adhesive faces are protected with two release liner substrate layers that are polyester resin film layers. In this embodiment, for comparison with the authentic item, additional $^{14}C$ analysis can be conducted on yet another constituent (e.g. an acrylic or rubber-based PSA layer) formed from a material other than a polyester resin. When the object of interest is a PSA sheet, the judging step can additionally include comparison of biobased content in PSA between the authentic item and the object of interest.

Constitutional Examples of PSA Sheet

Described next is a PSA sheet for which the authenticity judging method disclosed herein is preferably used. The PSA sheet disclosed herein can be a traceable PSA sheet of which a constituent (PSA layer, substrate layer, release liner substrate layer, etc.) has a biobased content from which a judgement can be made on whether an item is authentic or inauthentic. The PSA sheet according to some embodiments can be a PSA sheet having the PSA layer on one or each face of a non-releasable substrate (support substrate). Such a PSA sheet can be a release-lined PSA sheet having a release liner protecting the surface of the PSA layer. The PSA sheet according to other embodiments can be a substrate-free PSA sheet (i.e. a PSA sheet free of a non-releasable substrate) in which the PSA layer is held on a release liner.

The concept of PSA sheet here encompasses so-called PSA tapes, PSA labels, PSA films and the like. The PSA layer disclosed herein is typically formed in a continuous manner, but is not limited to such an embodiment. The PSA layer may be formed in a regular or random pattern of dots, stripes, etc. The PSA sheet disclosed herein may be in a rolled form or in a flat sheet form. Alternatively, the PSA sheet may be further processed into various forms.

As used herein, the term "PSA" refers to, as described earlier, a material that exists as a soft solid (a viscoelastic material) in a room temperature range and has a property to adhere easily to an adherend with some pressure applied. As defined in "*Adhesion: Fundamentals and Practice*" by C. A. Dahlquist (McLaren & Sons (1966), P. 143), PSA referred to herein may generally be a material that has a property satisfying complex tensile modulus $E^*(1\ Hz) < 10^7\ dyne/cm^2$ (typically, a material that exhibits the described characteristics at 25° C.).

Figure 2:
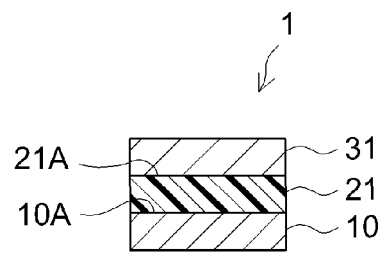
FIG. 2 shows a cross-sectional diagram schematically illustrating a constitutional example of the PSA sheet.
Figure 3:
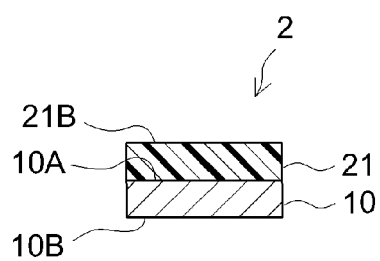
FIG. 3 shows a cross-sectional diagram schematically illustrating another constitutional example of the PSA sheet.

The PSA sheet disclosed herein can have cross-sectional structures schematically illustrated in FIG. 2 to FIG. 7. Among them, FIG. 2 and FIG. 3 show constitutional examples of the adhesively single-faced, substrate-supported PSA sheet. PSA sheet 1 shown in FIG. 2 has a PSA layer 21 provided to one (first) face 10A (non-releasable) of a substrate layer 10. PSA sheet 1 before used (i.e. before applied to an adherend) has a constitution where a surface (contact face) 21A of PSA layer 21 is protected with a release liner 31 of which at least the PSA layer side is a release face. PSA sheet 2 shown in FIG. 3 has a constitution where PSA layer 21 is provided to the first face 10A (non-releasable) of substrate layer 10. In PSA sheet 2, the other (second) face 10B of substrate layer 10 is a release face; and before used, when PSA sheet 2 is wound, PSA layer 21 is brought in contact with the second face 10B and the surface (contact face) 21B of the PSA layer is protected with the second face 10B of substrate layer 10.

Figure 4:
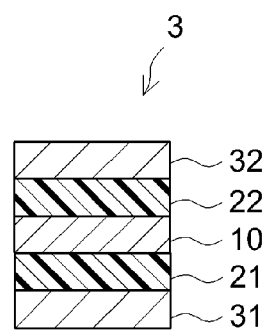
FIG. 4 shows a cross-sectional diagram schematically illustrating another constitutional example of the PSA sheet.
Figure 5:
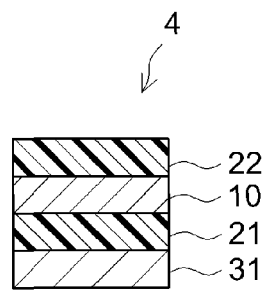
FIG. 5 shows a cross-sectional diagram schematically illustrating another constitutional example of the PSA sheet.

FIG. 4 and FIG. 5 show constitutional examples of the adhesively double-faced, substrate-supported PSA sheet. PSA sheet 3 shown in FIG. 4 has PSA layers 21 and 22 provided to the respective faces (both non-releasable) of substrate layer 10. PSA sheet 3 before used has a constitution where PSA layers 21 and 22 are protected, respectively, with release liners 31 and 32 each having a release face at least on the PSA layer side. PSA sheet 4 shown in FIG. 5 has PSA layers 21 and 22 on the respective faces (both non-releasable) of substrate layer 10; and before used, it has a constitution where between the two, PSA layer 21 is protected with release liner 31 of which both faces are release faces. By winding PSA sheet 4 to bring the other PSA layer 22 in contact with the backside of release liner 31, PSA sheet 4 can be made in an embodiment where PSA layer 22 is also protected with release liner 31.

Figure 6:
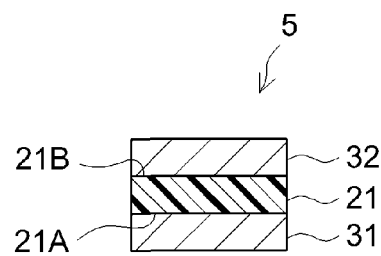
FIG. 6 shows a cross-sectional diagram schematically illustrating another constitutional example of the PSA sheet.
Figure 7:
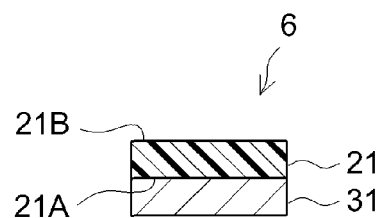
FIG. 7 shows a cross-sectional diagram schematically illustrating another constitutional example of the PSA sheet.

FIG. 6 and FIG. 7 show constitutional examples of the substrate-free, adhesively double-faced PSA sheet. PSA sheet 5 shown in FIG. 6 has a constitution in which before used, both faces 21A and 21B of a substrate-free PSA layer 21 are protected, respectively, with release liners 31 and 32 each having a release face at least on the PSA layer side. PSA sheet 6 shown in FIG. 7 has a constitution in which before used, one (first) surface (contact face) 21A of substrate-free PSA layer 21 is protected with release liner 31 of which both faces are release faces. When it is wound to bring the other surface (contact face) 21B of PSA layer 21 in contact with the backside of release liner 31, it can be made in an embodiment where the other (second) face 21B is also protected with release liner 31.

<PSA Layer>

In the art disclosed herein, the type of PSA forming the PSA layer is not particularly limited. The PSA (possibly a PSA composition) may comprise one, two or more species among various rubber-like polymers such as acrylic polymers, rubber-based polymers, polyester-based polymers, urethane-based polymers, polyether-based polymers, silicone-based polymers, polyamide-based polymers and fluoropolymers known in the field of PSA. From the standpoint of the adhesive properties, cost, etc., a PSA (acrylic PSA) comprising an acrylic polymer as the primary component and a PSA (rubber-based PSA) comprising a rubber-based polymer as the primary component are preferable. Examples of the rubber-based PSA include a natural rubber-based PSA and a synthetic rubber-based PSA. A modified rubber-based PSA such as acrylated natural rubber can be preferably used as well. The PSA layer's biobased content can be adjusted by a species of polymer forming the PSA and its content ratio.

The PSA layer may include various additives generally known in the field of PSA compositions as necessary, such as various rosin-based and terpene-based tackifier resins, various crosslinking agents such as isocyanate-based and epoxy-based kinds, a crosslinking aid, leveling agent, plasticizer, filler, colorant (pigment, dye, etc.), antistatic agent, anti-aging agent, UV absorber, antioxidant and photo-stabilizer. As for these various additives, heretofore known species can be used by typical methods. The PSA layer's biobased content can also be adjusted by a species of additive and its amount used.

The form of PSA composition for forming PSA layers is not particularly limited. For instance, it can be an aqueous PSA composition, solvent-based PSA composition, hot-melt PSA composition, or active energy ray-curable PSA composition. The PSA layer disclosed herein can be formed from a PSA composition by a heretofore known method. The PSA composition can be applied, using a heretofore known coater, for instance, a gravure roll coater, reverse roll coater, kiss roll coater, dip roll coater, die coater, bar coater, knife coater and spray coater. Alternatively, the PSA composition can be applied by immersion, curtain coating, etc. From the standpoints of accelerating the crosslinking reaction, improving production efficiency, and the like, it is preferable to dry the PSA composition under heating. The drying temperature can be, for example, about 40° C. to 150° C., or preferably about 60° C. to 130° C. After drying the PSA composition, aging may be implemented for purposes such as adjusting the distribution or migration of components in the PSA layer, advancing the crosslinking reaction, and lessening possible strain in the substrate and the PSA layer.

The PSA layer's biobased content is not particularly limited. Due to the usage percentage of biomass-derived materials such as natural rubber and rosin, the PSA layer's biobased content can be, for instance, about 1% or higher, about 10% or higher, about 30% or higher, about 50% or higher, or even about 70% or higher (e.g. about 80% or higher). When the PSA layer's biobased content is at a specific percentage in a range at or above such a prescribed percentage, the PSA sheet can be traced and counterfeits can be identified based on the PSA layer's biobased content. The PSA layer's biobased content can be about 90% or lower, about 60% or lower, about 40% or lower, about 20% or lower (e.g. 1% or lower), or even essentially 0%.

In the PSA sheet disclosed herein, the thickness of the PSA layer is not particularly limited and can be suitably selected in accordance with the purpose. In view of the balance between adhesion to adherend and cohesion, the thickness of the PSA layer can be, for instance, about 2 µm to 500 µm. From the standpoint of the adhesion to adherend, the thickness of the PSA layer is suitably 3 µm or greater, or preferably 5 µm or greater. From the standpoint of making the PSA sheet thinner, the thickness of the PSA layer can be, for instance, 200 µm or less, 150 µm or less, 100 µm or less, 70 µm or less, 50 µm or less, or even 30 µm or less. In an embodiment where thinning is of greater importance, the thickness of the PSA layer can be, for instance, 20 µm or less, 15 µm or less, or even 12 µm or less. When the PSA sheet disclosed herein is a double-faced PSA sheet having a PSA layer on each face of a substrate, the respective PSA layers may have the same thickness or different thicknesses.

<Substrate Layer>

The PSA sheet disclosed herein may be in a substrate-supported PSA sheet form having a PSA layer on one or each face of a substrate (layer). As the substrate (layer), various substrate films can be used. For instance, resin film, paper, fabrics, rubber sheets, foam sheets, metal foil, a composite of these and the like can be used. In the field of electronic devices, it is preferable to use resin film, a rubber sheet, a foam sheet, metal foil, a composite of these or the like less likely to form dust (e.g. fine fibers or particles such as paper dust). In particular, resin films are preferable from the standpoint of the size stability, thickness precision, cost, ease of processing, tensile strength, etc. The resin film may have a monolayer structure or a multilayer structure with two, three or more layers (e.g. at least one layer among them being a biomass resin film layer described later). From the standpoint of the size stability, the resin film preferably has a monolayer structure. As used herein, the "resin film" typically refers to a non-porous film and is conceptually distinct from so-called non-woven and woven fabrics.

Examples of the resin film include polyester resin films formed from polyesters such as PET, PEN, PBT, PBN, PEF and PBS; polyolefin films such as PE, PP, ethylene-propylene copolymer, and ethylene-butylene copolymer; vinyl chloride resin film; vinylidene chloride resin film; vinyl acetate resin film; polystyrene film; polyacetal film; polyimide film; polyamide film; fluororesin film; and cellophane. In some embodiments, from the standpoint of the strength and the ease of processing, polyester resin film is preferably used as the substrate layer. In particular, PET resin film is more preferable.

(Biomass Substrate Layer)

As the material for forming the substrate layer, a biomass material can be used. According to such an embodiment, because the substrate layer includes biomass carbon, for instance, based on the biobased content of the substrate layer in the PSA sheet, the authenticity can be preferably judged. The biomass material (typically a biomass resin material) possibly forming the substrate layer is not particularly limited. Examples include biomass polyester resins such as biomass PET resin, biomass PEN resin, biomass PBT resin, biomass PBN resin, biomass PEF resin, biomass PBS resin and biomass polytrimethylene terephthalate resin; biomass polyolefin resins such as biomass polyethylene resins including biomass high density polyethylene (biomass HDPE) resin, biomass low density polyethylene (biomass LDPE) resin and biomass linear low density polyethylene (biomass LLDPE) resin as well as biomass polypropylene (biomass PP) resin; polylactic acid; biomass poly(3-hydroxybutyrate-co-3-hydroxyhexanoate); biomass polyamide resins such as polyhexamethylene sebacamide and poly (xylene sebacamide); biomass polyurethane resins such as biomass polyester ether urethane resin and biomass polyether urethane resin; and cellulose-based resins. Among these, solely one species or a combination of two or more species can be used. In particular, biomass polyester resins and biomass polyolefin resins are preferable; and biomass PET resin is especially preferable. These biomass materials are resin materials and thus can be preferably used in an embodiment where the substrate layer is a resin film. With the use of a biomass resin film material formed from the biomass material, an authenticity judgment can be made with great reliability based on its biobased content.

(Biomass Polyester Resin Film)

In some preferable embodiments, the substrate layer of the PSA sheet is formed from polyester resin film. Such a polyester resin film substrate layer comprises biomass carbon, and based on the percent $^{14}C$, an authenticity judgment can be made with great reliability. As the polyester resin forming the polyester resin film, it is typical to use a polyester resin comprising, as the primary component, a polyester obtained by polycondensation of a dicarboxylic acid and a diol. A biomass-derived compound can be used in at least one (e.g. in each) between the dicarboxylic acid and the diol used for the synthesis to obtain a biomass polyester resin.

Examples of the dicarboxylic acid (or "dicarboxylic acid residue" in a post-synthesis polyester) forming the polyester include aromatic dicarboxylic acids such as phthalic acid, isophthalic acid, terephthalic acid, 2-methylterephthalic acid, 5-sulfoisophthalic acid, 4,4'-diphenyldicarboxylic acid, 4,4'-diphenyl ether dicarboxylic acid, 4,4'-diphenyl ketone dicarboxylic acid, 4,4'-diphenoxyethane dicarboxylic acid, 4,4'-diphenylsulfone dicarboxylic acid, 1,4-naphthalene dicarboxylic acid, 1,5-naphthalene dicarboxylic acid, 2,6-naphthalene dicarboxylic acid and 2,7-naphthalene dicarboxylic acid; alicyclic dicarboxylic acids such as 1,2-cyclohexane dicarboxylic acid, 1,3-cyclohexane dicarboxylic acid, and 1,4-cyclohexane dicarboxylic acid; aliphatic dicarboxylic acids such as malonic acid, succinic acid, glutaric acid, adipic acid, pimelic acid, suberic acid, azelaic acid, sebacic acid, 1,9-nonanedioic acid and 1,12-dodecanedioic acid; unsaturated dicarboxylic acids such as maleic acid, anhydrous maleic acid, and fumaric acid; and derivatives of these (e.g. lower alcohol esters of the dicarboxylic acids such as terephthalic acid, etc.). These can be used singly as one species or in a combination of two or more species.

The dicarboxylic acid forming the polyester may comprise terephthalic acid as the primary component. Specific examples of the polyester resin in this embodiment include PET resin and PBT resin. In such an embodiment, the percentage of terephthalic acid in the entire dicarboxylic acid forming the polyester is suitably about 50% by weight or higher. From the standpoint of sufficiently obtaining the effect of the use of terephthalic acid, it is preferably about 90% by weight or higher (typically 95% by weight or higher, e.g. 99% to 100% by weight). In the polyester synthesis, terephthalic acid can be used as a derivative, for instance, a lower terephthalic acid alkyl ester.

As the dicarboxylic acid, a biomass-derived dicarboxylic acid can be preferably used. By this, the polyester resin film can include a prescribed amount of biomass carbon. In some embodiments, as the dicarboxylic acid, biomass-derived terephthalic acid and a derivative thereof can be used. The method for obtaining the biomass-derived dicarboxylic acid is not particularly limited. Examples include a method (WO 2009/079213) where isobutanol is obtained from corn, saccharides or wood and then converted to isobutylene; this is dimerized to obtain isooctene from which p-xylene is synthesized by the method according to Chemische Technik, vol. 38, No. 3, p 116-119; 1986, that is, via radical cleavage, recombination and cyclization; and p-xylene is oxidized to obtain biomass-derived terephthalic acid.

No particular limitations are imposed on the percentage of biomass-derived dicarboxylic acid (e.g. terephthalic acid) in the dicarboxylic acid (e.g. terephthalic acid) forming the polyester. From the standpoint of the precision of analysis, of the entire dicarboxylic acid forming the polyester, the biomass-derived dicarboxylic acid accounts for about 1% by weight or more (e.g. 1% to 100% by weight), suitably about 10% by weight or more, for instance, possibly about 50% by weight or more, about 80% by weight or more, about 90% by weight or more, or even about 99% by weight or more. Essentially all of the dicarboxylic acid can be a biomass-derived dicarboxylic acid. In other embodiments (e.g. an embodiment where the polyester-forming diol comprises a biomass-derived diol), of the entire dicarboxylic acid, the biomass-derived dicarboxylic acid may account for less than 1% by weight. The polyester may be essentially free of a biomass-derived diol.

Examples of the diol (or "diol residue" in a post-synthesis polyester) forming the polyester include aliphatic diols such as ethylene glycol, diethylene glycol, polyethylene glycol, propylene glycol, polypropylene glycol, 1,2-propanediol, 1,3-propanediol, 1,5-pentanediol, neopentyl glycol, 1,2-butanediol, 2,3-butanediol, 1,4-butanediol, 1,6-hexanediol, 1,8-octanediol, and polyoxytetramethylene glycol; alicyclic diols such as 1,2-cyclohexanediol, 1,4-cyclohexanediol, 1,1-cyclohexanedimethylol, and 1,4-cyclohexanedimethylol, and aromatic diols such as xylylene glycol, 4,4'-dihydroxybiphenyl, 2,2-bis(4'-hydroxyphenyl)propane, and bis(4-hydroxyphenyl)sulfone. These can be used singly as one species or in a combination of two or more species. From the standpoint of the transparency, etc., aliphatic diols are preferable and ethylene glycol is particularly preferable. The percentage of the aliphatic diol (preferably ethylene glycol) in the diol forming the polyester is preferably 50% by weight or higher (e.g. 80% by weight or higher, typically 95% by weight or higher). The diol may essentially consist of ethylene glycol.

The diol forming the polyester may comprise ethylene glycol as the primary component. Specific examples of the polyester resin in this embodiment include biomass PET resin and biomass PEN resin. In such an embodiment, the percentage of ethylene glycol in the entire diol forming the polyester is suitably about 50% by weight or higher. From the standpoint of sufficiently obtaining the effect of the use of ethylene glycol, it is preferably about 90% by weight or higher (typically 95% by weight or higher, e.g. 99% to 100% by weight).

As the diol, biomass-derived diol (typically biomass diol obtained from biomass ethanol as the starting material) can be preferably used. By this, the polyester resin film can include a prescribed amount of biomass carbon. In some preferable embodiments, as the diol, biomass-derived ethylene glycol (typically biomass ethylene glycol obtained from biomass ethanol as the starting material) can be used.

Of the diol (favorably ethylene glycol) forming the polyester, the percentage of biomass-derived diol (favorably ethylene glycol) is not particularly limited. From the standpoint of the accuracy of analysis, the ratio of biomass-derived diol in the entire diol forming the polyester is about 1% by weight or higher (e.g. 1% to 100% by weight), suitably about 10% by weight or higher, for instance, possibly 50% by weight or higher, about 80% by weight or higher, about 90% by weight or higher, or even about 99% by weight or higher. Essentially all of the diol can be biomass-derived diol. In other embodiments (e.g. an embodiment where the dicarboxylic acid forming the polyester includes a biomass-derived dicarboxylic acid), the ratio of biomass-derived diol in the entire diol can be below 1% by weight or the polyester may be essentially free of a biomass-derived diol.

The polyester can be essentially formed from a dicarboxylic acid and a diol; however, for purposes such as introducing a desirable functional group, adjusting the molecular weight and so on, it may be possible to copolymerize a tri- or higher polycarboxylic acid, tri- or higher polyol, monocarboxylic acid, monohydric alcohol, hydroxycarboxylic acid, lactone or the like while the effect of the art disclosed is not impaired. These other co-monomers can be biomass-derived or non-biomass-derived. Suitably, the other co-monomers account for, for instance, less than 30% by mole, or typically less than about 10% by mole (or even less than 1% by mole). The art disclosed herein can also be preferably implemented in an embodiment where the monomers of the polyester are essentially free of the other co-monomers.

The method for obtaining the polyester disclosed herein is not particularly limited. A polymerization method known as a synthetic method for polyester can be suitably employed. From the standpoint of the polymerization efficiency and molecular weight adjustment, etc., a starting monomer used for the polyester synthesis can be obtained by polycondensation of a dicarboxylic acid and a diol at a suitable molar ratio. More specifically, the polyester can be synthesized by allowing the carboxylic acid's carboxy group and the diol's hydroxy group to undergo reaction while typically eliminating the water formed by the reaction (i.e. by-product water) out of the reaction system. As the method for eliminating the by-product water out of the reaction system, it is possible to use a method where inert gas is allowed to flow into the reaction system to eliminate by-product water along itself out of the reaction system, a method (depressurization method) where the by-product water is eliminated out of the reaction system under reduced pressure, and like method. As it is likely to shorten the time for synthesis and is suited for improving the productivity, the depressurization method can be preferably used. The reaction can be batch polymerization, semi-continuous polymerization, or continuous polymerization.

The reaction temperature when carrying out the reaction (including esterification and polycondensation) and the depressurization level (the pressure inside the reaction system) in case of employing the depressurization method can be suitably set so as to efficiently obtain a polymer having the aimed properties (e.g. molecular weight). While no particular limitations are imposed, in view of the reaction rate, preventing degradation, etc., the reaction temperature is suitably 180° C. to 290° C. (e.g. 250° C. to 290° C.). While no particular limitations are imposed, in view of the sort of reaction efficiency, the depressurized level is suitably at or below 10 kPa (typically at 10 kPa to 0.1 kPa), for instance, possibly at 4 kPa to 0.1 kPa. From the standpoint of stably maintaining the pressure inside the reaction system, it is suitable that the reaction system has an internal pressure of 0.1 kPa or higher.

In the reaction, similar to general polyester synthesis, a known or commonly used catalyst can be used in a suitable amount for esterification or condensation. Examples of ester exchange catalysts include magnesium-based, manganese-based, calcium-based, cobalt-based, lithium-based, titanium-based, zinc-based and barium-based compounds. Examples of polymerization catalysts include various metal compounds such as titanium-based, aluminum-based germanium-based, antimony-based, tin-based, and zinc-based compounds; and strong acids such as p-toluenesulfonic acid and sulfuring acid. In the synthesis, a solvent may be used or may not be used. The synthesis can be carried out essentially without using an organic solvent (e.g. meaning to exclude an embodiment involving intentional use of an organic solvent as the reaction solvent for the reaction). In the reaction, additives such as stabilizer (a phosphorous compound, etc.) can be optionally added.

The biomass polyester resin film used in the art disclosed herein may include a non-polyester polymer in addition to the polyester. Favorable examples of the non-polyester polymer include those that are not polyester among the various polymer materials exemplified earlier as the resin film possibly forming the substrate layer. The non-polyester polymer can be a biomass-derived polymer or a fossil-based polymer. In an embodiment where the polyester resin film layer includes a non-polyester polymer in addition to the polyester, the non-polyester polymer content is suitably less than 100 parts by weight to 100 parts by weight of polyester, preferably about 50 parts by weight or less, more preferably about 30 parts by weight or less, or yet more preferably about 10 parts by weight or less. The non-polyester polymer content relative to 100 parts by weight of polyester can be about 5 parts by weight or less, or even about 1 part by weight or less. The art disclosed herein can be preferably implemented in an embodiment where, for instance, the polymer in the polyester resin film layer is 99.5% to 100% polyester by weight.

The biobased content of the biomass polyester resin film disclosed herein is not particularly limited. It is about 1% or higher, or suitably about 5% or higher. When the biobased content of the biomass polyester resin film is increased to obtain a specific $^{14}C$ percentage, the reliability of authenticity judgements can be improved based on the results of $^{14}C$ analysis. From such a standpoint, the biobased content of the biomass polyester resin film is preferably about 8% or higher, more preferably about 12% or higher (e.g. about 15% or higher), possibly about 30% or higher, or even about 60% or higher; or it can be at a specific percentage selected from the range at or above about 90% or higher. The maximum biobased content of the biomass polyester resin film is 100%. From the standpoint of the cost effectiveness, ease of making authenticity judgments, etc., it can be below 50%, or even below 40%; or it can be at a specific percentage selected from the range below 30% (e.g. below 20 V.

For the method for producing the biomass polyester resin film disclosed herein, except for using a biomass polyester resin, a heretofore known method can be suitably employed without particular limitations. For instance, the biomass polyester resin film can be fabricated, using a biomass polyester resin prepared by a known polyester synthesis method while using the aforementioned materials, or a commercial biomass-derived polyester (e.g. product name PLANTPET available from Teijin, Ltd.); and adding suitable amounts of various additives if necessary and suitably employing a film-molding method such as extrusion, inflation molding, T-die casting, and calendar rolling.

The thickness of the biomass polyester resin film layer is not particularly limited and can be suitably selected in accordance with the purpose. The biomass polyester resin film layer suitably has a thickness of about 1 µm or greater. From the standpoint of the handling properties and ease of processing, it can be, for instance, 1.5 µm or greater, 2 µm or greater, 3 µm or greater, 4 µm or greater, or even 4.5 µm or greater. When the biomass polyester resin film layer has at least a prescribed thickness, there is a tendency towards improving the ease of processing into complex shapes and the ease of reworking (ease of removal) in case of a failed application. From the standpoint of making the PSA sheet thinner, in some embodiments, the biomass polyester resin film layer has a thickness of, for instance, 150 µm or less, 100 µm or less, 50 µm or less, 25 µm or less, 20 µm or less, 10 µm or less, 7 µm or less, less than 5 µm, or even less than 4 µm.

To the substrate layer (e.g. a resin film layer), various additives can be added as necessary, such as a filler (inorganic filler, organic filler, etc.), anti-aging agent, antioxidant, UV absorber, antistatic agent, slip agent, plasticizer and colorant (pigment, dye, etc.). The amount of the various additives is usually about 30% by weight or less (e.g. 20% by weight or less, typically 10% by weight or less). For instance, when a pigment (e.g. white pigment) is included in the substrate layer, the pigment content is suitably 0.1% to 10% by weight (e.g. 1% to 8% by weight, typically 1% to 5% by weight).

The face of the substrate layer (e.g. resin film, a rubber sheet, a foam sheet, etc.) on which the PSA layer is placed (i.e. the PSA layer-side surface) may be subjected to a known or common surface treatment such as corona discharge treatment, plasma treatment, UV irradiation, acid treatment, base treatment and formation of a primer layer. Such surface treatment may be carried out to increase the tightness of adhesion between the substrate layer and the PSA layer, that is, the anchoring of the PSA layer to the substrate layer. Alternatively, the substrate layer may be free of any surface treatment to enhance the anchoring of the PSA layer-side surface. When forming a primer layer, the primer used for the formation is not particularly limited and a suitable species can be selected among known primers. The thickness of the primer layer is not particularly limited. For instance, it can be above 0.01 μm; and it is suitably 0.1 μm or greater. From the standpoint of obtaining greater effects, it can also be 0.2 μm or greater. The thickness of the primer layer is preferably less than 1.0 μm, or possibly 0.7 μm or less, or even 0.5 μm or less.

In a single-faced PSA sheet having a PSA layer on one face of the substrate layer, the PSA layer-free face (backside) of the substrate layer may be subjected to release treatment with a release agent (backside treatment agent). The backside treatment agent possibly used for formation of the backside treatment layer is not particularly limited. It is possible to use silicone-based backside treatment agents, fluorine-based backside treatment agents, long-chain alkyl-based backside treatment agents and other known or common agents in accordance with the purpose and application. For the backside treatment agent, solely one species or a combination of two or more species can be used.

In the PSA sheet having a substrate layer, the substrate layer's biobased content is not particularly limited. The substrate layer's biobased content is, for instance, about 1% or higher, or suitably about 5% or higher. When the substrate layer's biobased content is increased to obtain a specific $^{14}C$ percentage, authenticity judgments can be made with great reliability based on the results of $^{14}C$ analysis. From such a standpoint, the substrate layer's biobased content is preferably about 8% or higher, more preferably about 12% or higher (e.g. about 15% or higher), possibly about 30% or higher, or even about 60% or higher; or it can be at a specific percentage selected from the range at or above about 90%. The maximum biobased content of the substrate layer is 100%. From the standpoint of the cost effectiveness, ease of making authenticity judgments, etc., it can be below 50%, or even below 40%; or it can be at a specific percentage selected from the range below 30% (e.g. below 20 V. The substrate layer's biobased content can also be about 10% or lower (e.g. 1% or lower), or can be essentially 0%.

The thickness of the substrate layer is not particularly limited and can be suitably selected in accordance with the purpose. For instance, it is in the range of about 1 μm to 500 μm. From the standpoint of the substrate layer's handling properties and ease of processing, the thickness of the substrate layer can be, for instance, 1.5 μm or greater, 2 μm or greater, 3 μm or greater, 4 μm or greater, or even 4.5 μm or greater. From the standpoint of making the PSA sheet thinner, in some embodiment, the thickness of the substrate layer can be, for instance, 150 μm or less, 100 μm or less, 50 μm or less, 25 μm or less, 20 μm or less, 10 μm or less, 7 μm or less, less than 5 μm, or even less than 4 μm.

<Release Liner>

The PSA sheet disclosed herein may be provided, as necessary, as a release-lined PSA sheet in which a release liner is adhered to an adhesive face (of a PSA layer, the face on the side applied to an adherend) to protect the adhesive face. The release liner is not particularly limited. It is possible to use, for instance, a release liner in which a surface of a liner substrate (resin film, paper, etc.) has been subjected to release treatment, or a release liner formed from a low-adhesive material such as a fluoropolymer (polytetrafluoroethylene, etc.) or a polyolefinic resin (PE, PP, etc.).

As the resin film (layer) of the release liner, it is preferable to use a polyester resin film such as PET resin film; a polyolefin resin film such as PP and ethylene-propylene copolymer, a thermoplastic resin film such as polyvinyl chloride film. From the standpoint of the strength and ease of processing, a polyester resin film is more preferable. For the release treatment, it is possible to use, for instance, a release agent such as silicone-based, fluorine-based, long-chain alkyl based, fatty acid amide-based species, and molybdenum sulfide; silica powder, etc. A resin film (e.g. polyester resin film) that has been subjected to release treatment can be preferably used as the release liner. The release treatment layer can be formed at least on one face (e.g. each face) of the resin film.

The release liner substrate layer can be formed, using a biomass material. By this, the release liner substrate layer comprises biomass carbon. As the biomass material (typically a biomass resin material), one, two or more suitable species can be selected and used among the materials exemplified as the biomass material for the biomass substrate layer. On such a release liner, an authenticity judgment can be made with great reliability based on the biobased content of the release liner substrate layer. As a particularly preferable biomass release liner substrate layer, a biomass polyester resin film is used. Details of the biomass polyester resin film are as described above; and therefore, redundant description will not be repeated.

In an embodiment having a release liner protecting an adhesive face of the PSA layer, the biobased content of the release liner substrate layer is not particularly limited. The biobased content of the release liner substrate layer is, for instance, about 1% or higher, or suitably about 5% or higher. When the biobased content of the release liner substrate layer is increased to obtain a specific $^{14}C$ percentage, authenticity judgments can be made with great reliability based on the results of $^{14}C$ analysis. From such a standpoint, the biobased content of the release liner substrate layer is preferably about 8% or higher, more preferably about 12% or higher (e.g. about 15% or higher), possibly about 30% or higher, or even about 60% or higher; or it can be at a specific percentage selected from the range at or above about 90%. The maximum biobased content of the release liner substrate layer is 100%. From the standpoint of the cost effectiveness, ease of authenticity judgments, etc., it can be below 50%, or even below 40%; or it can be at a specific percentage selected from the range below 30% (e.g. below 20%). The biobased content of the release liner substrate layer can also be about 10% or lower (e.g. 1% or lower), or can be essentially 0%. In a substrate-free adhesively-double-faced PSA sheet (double-faced PSA sheet), when protecting the respective faces with two release liners, the biobased contents of the respective release liner substrate layers can be the same or different.

The release liner's thickness is not particularly limited. From the standpoint of the conformability to the adhesive face and the efficiency of removal, it is, for instance, possibly about 5 μm to 200 μm, or preferably about 10 μm to 100 μm. In an embodiment of the double-faced PSA sheet of which the respective adhesive faces are protected with two release liners, in view of the efficiency of removing the release liners, the respective release liners preferably differ in thickness. For instance, the first release liner can have a thickness of about 10 μm to 200 μm (typically about 30 μm to 100 μm, e.g. about 50 μm to 80 μm) and the second release liner can have a thickness of about 5 μm or greater and less than 100 μm (typically about 8 μm or greater and less than 50 μm, e.g. about 12 μm to 40 μm). The thickness of the first release liner is preferably about 1.5 times to 5 times (e.g. 2 times to 3 times) the thickness of the second release liner.

When the art disclosed herein is implemented in an embodiment that uses a release-lined PSA sheet having a PSA layer, a substrate layer supporting the PSA layer and a release liner protecting an adhesive face of the PSA layer, by using biomass polyester resin films in both the substrate layer and the release liner, the reliability of authenticity judgments can be further increased by comparing the $^{14}$C percentages of the multiple biomass polyester resin films. When the art disclosed herein is implemented using a double-faced PSA sheet of which both adhesive faces are protected with two release liners, by using biomass polyester resin films in the two release liners, the reliability of authenticity judgments can be further increased. Furthermore, with respect to a double-faced PSA sheet having a substrate layer, in addition to the two release liners, by using a biomass polyester resin film in the substrate layer, the reliability of authenticity judgments can be further increased. The biomass polyester resin films in the substrate layer and two release liners can have the same or individually different percentages of $^{14}$C in accordance with expected counterfeits and the ease of making authenticity judgments.

<PSA Sheet>

The thickness (total thickness) of the PSA sheet disclosed herein (which includes the PSA layer and further includes the substrate in a substrate-supported PSA sheet, but excludes any release liner) is not particularly limited. It can be in a range of, for instance, about 2 μm to 1000 μm. In some embodiments, in view of the adhesive properties, etc., the thickness of the PSA sheet is preferably about 5 μm to 500 μm (e.g. 10 μm to 300 μm, typically 15 μm to 200 μm). Alternatively, in some embodiments where thinning is considered important, the PSA sheet may have a thickness of 100 μm or less (e.g. 5 μm to 100 μm), 70 μm or less (e.g. 5 μm to 70 μm), or even 45 μm or less (e.g. 5 μm to 45 μm).

The biobased content of the PSA sheet disclosed herein is not particularly limited. Biomass-derived carbons may account for more than 40% of the total carbon content in the PSA sheet. The biobased content of the PSA sheet can be 50% or higher, 60% or higher, 70% or higher, 75% or higher, or even 80% or higher. The maximum biobased content is 100% by definition. In some embodiments, the biobased content of the PSA sheet can be, for instance, 95% or lower. When adhesive properties are of greater importance, it can be 90% or lower, or even 85% or lower. The authenticity judging method disclosed herein can be preferably applied to such a PSA sheet.

<Applications>

The application of the PSA sheet disclosed herein is not particularly limited. One target can be a PSA sheet used in various applications where the emergence of counterfeits is expected. In a typical application, it is applied to a part of an electronic device, for purposes such as fixing, attaching and reinforcing the part. PSA sheets used in this application are hardly available in unused forms and often need to be judged for whether or not they are counterfeits while internal to products. In addition, as they are often tightly bonded to adherends, they are also susceptible to deformation and damage when they are being separated from main bodies of electronic devices. With respect to a PSA sheet used in such an application, the authenticity judging method disclosed herein can be preferably applied. The PSA sheet for use in these applications can be preferably used, typically as a double-faced PSA sheet, to fix or attach parts. From the standpoint of reducing the thickness, in some embodiments, it is possible to select a substrate-supported double-faced PSA sheet form that uses a thin substrate. For instance, it is possible to use a PSA sheet that has a substrate layer having a thickness of 10 μm or less (e.g. less than 5 μm).

The PSA sheet for fixing or attaching purposes, it may have at least a certain level of shear bonding strength. Such a PSA sheet exhibits strong resistance to a force that acts to slide bonding surfaces at their interface (i.e. a shear force), thereby showing excellent adherend-holding properties. For instance, it is possible to use a PSA sheet exhibiting a shear bonding strength of 1.8 MPa or greater (preferably 2.0 MPa or greater, more preferably 2.2 MPa or greater, e.g. 20 MPa or less).

The shear bonding strength can be measured by the method described next. A PSA sheet (typically a double-faced PSA sheet) is cut to a 10 mm by 10 mm size to prepare a measurement sample. In an environment at 23° C. and 50% RH, the respective adhesive faces of the measurement sample are overlaid and press-bonded onto the surfaces of two stainless steel plates (SUS304BA plates) with a 2 kg roller moved back and forth once. The resultant is left standing for two days in the same environment. Subsequently, using a tensile tester, the shear bonding strength (MPa) is determined at a tensile speed of 10 mm/min at a peel angle of 0°. As for an adhesively single-faced PSA sheet (single-faced PSA sheet), the non-adhesive face of the sheet is fixed to a stainless steel plate with an adhesive and the like and the resultant can be subjected to measurement in the same manner as above. As the tensile tester, a universal tensile/compression tester (product name TG-1kN available from Minebea Co., Ltd.) can be used.

The PSA sheet disclosed herein is suitable, for example, for fixing parts in mobile electronic devices. Non-limiting examples of the mobile electronic devices include a cellular phone, a smartphone, a tablet type personal computer, a notebook type personal computer, various wearable devices (for example, wrist wearable devices such as a wrist watch, modular devices worn on part of a body with a clip, a strap, or the like, eyewear type devices inclusive of eyeglasses type devices (monocular and binocular type; including head-mounted device), devices attached to clothing, for example, in the form of an accessory on a shirt, a sock, a hat, or the like, earwear type devices which are attached to the ear, such as an earphone), a digital camera, a digital video camera, an acoustic device (a mobile music player, an IC recorder, and the like), a calculator (electronic calculator and the like), a mobile game machine, an electronic dictionary, an electronic notebook, an e-book reader, an information device for an automobile, a mobile radio, a mobile television, a mobile printer, a mobile scanner, and a mobile modem. The PSA sheet disclosed herein can be preferably used, for example, for the purpose of fixing a pressure-sensitive sensor and other members in those mobile electronic devices, among the abovementioned mobile electronic devices, that include a pressure-sensitive sensor. In one preferred embodiment, the PSA sheet can be used for fixing a pressure-sensitive sensor and other members in an electronic device (typically, a mobile electronic device) having a function of enabling the designation of an absolute position on a plate corresponding to the screen (typically, a touch panel) in an apparatus for indicating the position on a screen (typically, a pen type or a mouse type apparatus) and an apparatus for detecting the position. The term "mobile" in this description means not just providing simple mobility, but further providing a level of portability that allows an individual (average adult) to carry it relatively easily.

<Verification Experiments>

Verification experiments related to the present invention are described below, but these specific examples are not to limit the present invention. In the description below, "parts" and "%" are by weight unless otherwise specified.

(Preparation of Authentic PSA Sheet)

Using commercial biomass PET resins, were obtained a first release liner having a 25 μm thick PET resin film substrate layer and a second release liner having a 75 μm thick PET resin film substrate layer. In the first and second release liners, one face of the PET resin film is a release face formed with a silicone-based release agent. Using a biomass PET resin, was also obtained a 4.5 μm thick PET resin film substrate. The biomass PET resins had been synthesized using terephthalic acid or a derivative thereof and a plant-based ethylene glycol as a biomass-derived material. With respect to the PET resin films of the first and second release liners as well as the PET resin film of the substrate, based on ASTM D6866, biobased contents were determined and all found to be 15%.

A PSA composition comprising a modified rubber as the primary component was applied to the respective release faces of the first and second release liners and allowed to dry at 100° C. for two minutes to form 13 μm thick PSA layers. Subsequently, the PSA layers formed on the first and second release liners were adhered to the respective faces of the 4.5 μm thick PET resin film substrate to prepare a PSA sheet (transfer method). The release liners were left as they were on the PSA layers and used to protect the surfaces (adhesive faces) of the PSA layers. The PSA sheet as a whole (excluding release liners) had a 76% biobased content.

(Preparation of PSA Sheet for Authenticity Judgement)

By the same method and using the same materials as the authentic PSA sheet, was obtained a PSA sheet A for an authenticity judgment. Using a commercial fossil-based PET resin film as the PET resin film for the release liner, was obtained a PSA sheet B for an authenticity judgment to have otherwise the same constitution as the authentic PSA sheet. Using a commercial fossil-based PET resin film as the PET resin film of the substrate, was obtained a PSA sheet C for an authenticity judgment to have otherwise the same constitution as the authentic PSA sheet. These PSA sheets were externally indistinguishable from each other.

(Measurement of Biobased Content)

With respect to the resulting PSA sheets A to C for authenticity judgments, biobased contents were determined for the PET resin films of their release liners and substrates as well as for the PSA sheets as wholes (excluding release liners) based on ASTM D6866. The results are shown in Table 1.

TABLE 1

| Biobased content (%) | Authentic | A | B | C |
|---|---|---|---|---|
| 1st Release liner | 15 | 15 | 0 | 15 |
| 2nd Release liner | 15 | 15 | 0 | 15 |
| Substrate | 15 | 15 | 15 | 0 |
| PSA sheet | 76 | 76 | 76 | 74 |

As shown in Table 1, PSA sheets A to C all showed the same or similar biobased contents as the authentic PSA sheet did; however, with the significant differences found in biobased content of release liner and substrate, it was easily judged that A was authentic while B and C were inauthentic. These results indicate that according to the art disclosed herein, the authenticity of a product or component can be quickly judged with great reliability.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 2, 3, 4, 5, 6 PSA sheets
10 substrate layer
21, 22 PSA layers
31, 32 release liners

The invention claimed is:

1. A method for judging product or component authenticity, the method including:
   a step of determining a percentage of radioactive carbon-14 based on ASTM 6866 with respect to at least one constituent included in a product or component of interest obtained,
   a step of judging the product or component of interest authentic when the constituent of the product or component of interest has a biomass carbon ratio in the range of ±5% of the biomass carbon ratio of the constituent of the authentic product or component, and judging the product or component of interest inauthentic when out of the ±5% range,
   wherein at least one constituent included in an authentic product or component that corresponds to the constituent of the product or component of interest includes a resin comprising a prescribed percentage of radioactive carbon-14,
   the product or component is a pressure-sensitive adhesive sheet,
   the pressure-sensitive adhesive sheet is one of the following:
   (A) a pressure-sensitive adhesive sheet comprising a substrate layer and a pressure-sensitive adhesive layer placed on at least one face of the substrate layer,
   (B) a release-lined pressure-sensitive adhesive sheet comprising a pressure-sensitive adhesive sheet that includes a substrate layer and a pressure-sensitive adhesive layer placed on at least one face of the substrate layer, and further comprising a release liner protecting an adhesive face of the pressure-sensitive adhesive layer, or
   (C) a release-lined pressure-sensitive adhesive sheet comprising a pressure-sensitive adhesive sheet formed of a pressure-sensitive adhesive layer, and further comprising a release liner protecting an adhesive face of the pressure-sensitive adhesive layer; and
   among the substrate layer, the pressure-sensitive adhesive layer and the release liner substrate layer, at least one is a constituent that includes a resin comprising a prescribed percentage of radioactive carbon-14.

2. The method according to claim 1, including a step of obtaining the product or component of interest from a market where the authentic product or a product comprising the authentic component is distributed.

3. The method according to claim 1, wherein the constituent of the authentic product or component has a biomass carbon ratio of 5% or higher.

4. The method according to claim 1, wherein
   the pressure-sensitive adhesive sheet has the pressure-sensitive adhesive layer, the substrate layer and the release liner substrate layer as the constituents, and the pressure-sensitive adhesive layer, the substrate layer and the release liner substrate layer comprise resins having the same or different percentages of radioactive carbon-14.

5. The method according to claim 1, wherein
the pressure-sensitive adhesive sheet has a polyester resin film layer as the substrate layer and/or the release liner substrate layer, and
the polyester resin film layer is a constituent comprising a prescribed percentage of radioactive carbon-14.

6. The method according to claim 1, wherein the pressure-sensitive adhesive sheet is an adhesively double-faced pressure-sensitive adhesive sheet and is a fixing member of a part forming an electronic device.

7. A pressure-sensitive adhesive sheet used in the method according to claim 1, the pressure-sensitive adhesive sheet having one of the following constitutions:
(A) a pressure-sensitive adhesive sheet comprising a substrate layer and a pressure-sensitive adhesive layer placed on at least one face of the substrate layer,
(B) a release-lined pressure-sensitive adhesive sheet comprising a pressure-sensitive adhesive sheet that includes a substrate layer and a pressure-sensitive adhesive layer placed on at least one face of the substrate layer, and further comprising a release liner protecting an adhesive face of the pressure-sensitive adhesive layer, or
(C) a release-lined pressure-sensitive adhesive sheet comprising a pressure-sensitive adhesive sheet formed of a pressure-sensitive adhesive layer, and further comprising a release liner protecting an adhesive face of the pressure-sensitive adhesive layer; and
among the substrate layer, the pressure-sensitive adhesive layer and the release liner substrate layer, at least one includes a resin comprising a prescribed percentage of radioactive carbon-14.

8. A pressure-sensitive adhesive sheet used in the method according to claim 1, the pressure-sensitive adhesive sheet having one of the following constitutions:
(A) a release-lined pressure-sensitive adhesive sheet comprising a pressure-sensitive adhesive sheet that includes a substrate layer and a pressure-sensitive adhesive layer placed on at least one face of the substrate layer, and further comprising a release liner protecting an adhesive face of the pressure-sensitive adhesive layer, or
(B) a release-lined pressure-sensitive adhesive sheet comprising a pressure-sensitive adhesive sheet formed of a pressure-sensitive adhesive layer, and further comprising a release liner protecting an adhesive face of the pressure-sensitive adhesive layer,
each of the substrate layer, the pressure-sensitive adhesive layer and the release liner substrate layer includes a resin comprising radioactive carbon-14.

9. A pressure-sensitive adhesive sheet used in the method according to claim 1, the pressure-sensitive adhesive sheet having one of the following constitutions:
(A) a pressure-sensitive adhesive sheet comprising a substrate layer and a pressure-sensitive adhesive layer placed on at least one face of the substrate layer,
(B) a release-lined pressure-sensitive adhesive sheet comprising a pressure-sensitive adhesive sheet that includes a substrate layer and a pressure-sensitive adhesive layer placed on at least one face of the substrate layer, and further comprising a release liner protecting an adhesive face of the pressure-sensitive adhesive layer, or
(C) a release-lined pressure-sensitive adhesive sheet comprising a pressure-sensitive adhesive sheet formed of a pressure-sensitive adhesive layer, and further comprising a release liner protecting an adhesive face of the pressure-sensitive adhesive layer;
wherein the constitution (A), (B) or (C) comprises a polyester resin film layer as the substrate layer and/or the release liner substrate layer; and
the polyester resin film has a biomass carbon ratio of 5% or higher.

* * * * *